United States Patent [19]

Johnson

[11] Patent Number: 5,063,274

[45] Date of Patent: Nov. 5, 1991

[54] ELECTRIC FENCE INSULATOR

[75] Inventor: John I. Johnson, Ottawa, Canada

[73] Assignee: ITW Plastiglide, Concord, Canada

[21] Appl. No.: 590,711

[22] Filed: Oct. 1, 1990

[30] Foreign Application Priority Data

Sep. 29, 1989 [CA] Canada .................................. 614990

[51] Int. Cl.[5] ......................... H01B 17/16; A01K 3/00

[52] U.S. Cl. ................................ 174/158 F; 174/175; 248/297.5

[58] Field of Search ........... 174/158 R, 158 F, 161 R, 174/161 F, 163 R, 163 F, 164, 166 R, 168, 174, 175; 248/297.5; 256/10, 47, 48

[56] References Cited

U.S. PATENT DOCUMENTS

| | | | |
|---|---|---|---|
| 3,191,805 | 6/1965 | Stanley | 248/297.5 X |
| 3,568,980 | 3/1971 | Hulburt et al. | 174/163 F |
| 3,752,902 | 8/1973 | Wilson | 174/163 F |
| 4,771,137 | 9/1988 | Thompson | 174/163 F |
| 4,965,413 | 10/1990 | Langlie et al. | 174/158 F |

FOREIGN PATENT DOCUMENTS

| | | | |
|---|---|---|---|
| 1559618 | 2/1969 | France | 174/158 F |

*Primary Examiner*—Laramie E. Askin

*Attorney, Agent, or Firm*—Schwartz & Weinrieb

[57] ABSTRACT

A plastic insulator for holding electrified wire comprises a support for an electrified wire and a connector device for selectively connecting the support to structures of different types. The connector device includes arms which have fastener receiving holes or apertures by means of which the support may be connected to a wooden post structure with separate fasteners. The arms also have oral apertures by means of which the support may be connected to a non-conductive rod structure without separate fasteners.

15 Claims, 5 Drawing Sheets

ELECTRIC FENCE INSULATOR

FIELD OF THE INVENTION

This invention relates to a support and more particularly to an insulator support for electrified wires or tapes for electric fences.

BACKGROUND OF THE INVENTION

Electrified fences are a common means for containing animals within a designated area, and include wires and/or tape material, capable of carrying an electric current, supported from posts or rods inserted within the ground. Often the electrified fence is added to an existing fence structure which may include wooden posts. Alternatively, the electrified fence may be located adjacent to an existing fence and supported by means of elongate non-conductive posts made of material such as, for example, fiberglass.

Historically, prior art electrified fences were typically a single component construction of galvanized steel wire which was sufficient to function both as a conducting medium and support. However, the art has developed whereby composite electric fence wire construction is more common, and Canadian Patent No. 1,176,885 (U.S. Pat. No. 4,728,080) to Kurschner et al is exemplary of this type of fence wire construction. There is provided a low-stretch, light weight support member of vinyl coated fiberglass and conductors of good conductivity such as, for example, aluminum. This construction comprises a twisted wire form, or a wider, interwoven tape.

One form of known insulator, as more fully set forth herein, provides narrow slots defined by means of rigid members, into which slots the wire or tape must be inserted. Often the molding of these insulators leaves rough spots within the slot which may tear or damage the conducting wire or support wire or tape. Another prior art insulator requires the wire to be attached in a manner which follows a tortuous path, unnecessarily adding kinks and bends to the tape at areas of support. Although these insulators can be nailed to a wooden fence post, there is no provision for easily connecting the insulators to non-conductive vertical support rods or posts. Usually additional wire or wrapping material is necessary when these prior art devices are used with non-conductive support rods rather than wooden posts.

Thus, it would be advantageous to have an insulator which can be easily connected to either wooden posts or non-conductive rods. Furthermore, it would be advantageous to provide an insulator which is cost effective but integrally molded in such fashion that wire or tape is quickly and easily connected to the insulator without the wire or tape having to undergo unnecessary bending or being subjected to possible tearing or damage.

OBJECT OF THE INVENTION

Accordingly, the invention seeks to provide a device adapted for supporting electrified wire from a variety of generally vertical supports, including wooden posts and non-conductive rods.

SUMMARY OF THE INVENTION

The invention broadly pertains to a plastic insulator for holding electrified wire comprising means for supporting an electrified wire, and means for selectively connecting the supporting means to structures of different types, the connecting means including first means by which the supporting means may be connected to a post structure with separate fastener means and second means by which the supporting means may be connected to a non-conductive rod structure without separate fastener means.

Preferably the connecting means comprise arms which include apertures defining the first means for accommodating separate drive fastener means and the arms also include the second means in the form of oval apertures defined therein, the major axis of each oval aperture lying along the axis of the respective arm. The two arms are identical and extend in opposite directions from the supporting means. The arms are flexibly connected to the supporting means whereby the arms may be bent rearwardly for telescopic association of the apertures with the rod.

Another aspect of the invention comprises the supporting means as comprising a backing portion and a securing portion, the securing portion being pivotally hinged to the backing portion, with means provided upon the portions for releasably locking the portions together so as to securely retain an electrified wire therebetween.

The locking means preferably comprise a female lock element associated with the backing portion, and a release tab extending therefrom, and a male lock element associated with the securing portion for cooperative association with the female lock element and releasable therefrom upon deflection of the release tab.

Preferably the female lock element includes tongue means and the male lock element includes lateral guide means for cooperation with the tongue means whereby in locked association, relative lateral movement between the lock elements is restricted by cooperation between the tongue means and the guide means.

BRIEF DESCRIPTION OF THE DRAWINGS

Other aspects of the invention will become more apparent from a detailed description of the preferred embodiments herein, when considered in connection with the accompanying drawings, in which like reference characters designate like or corresponding parts throughout the several views, and wherein.

Figure 4:
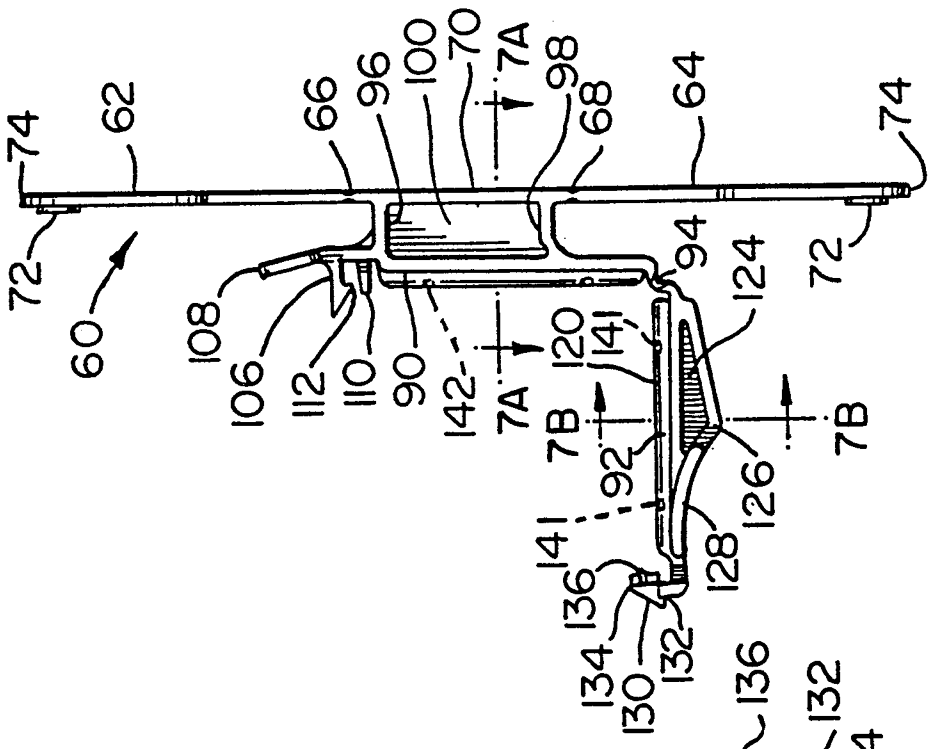
FIG. 4 is a side view of the novel insulator in the open position.
Figure 9:
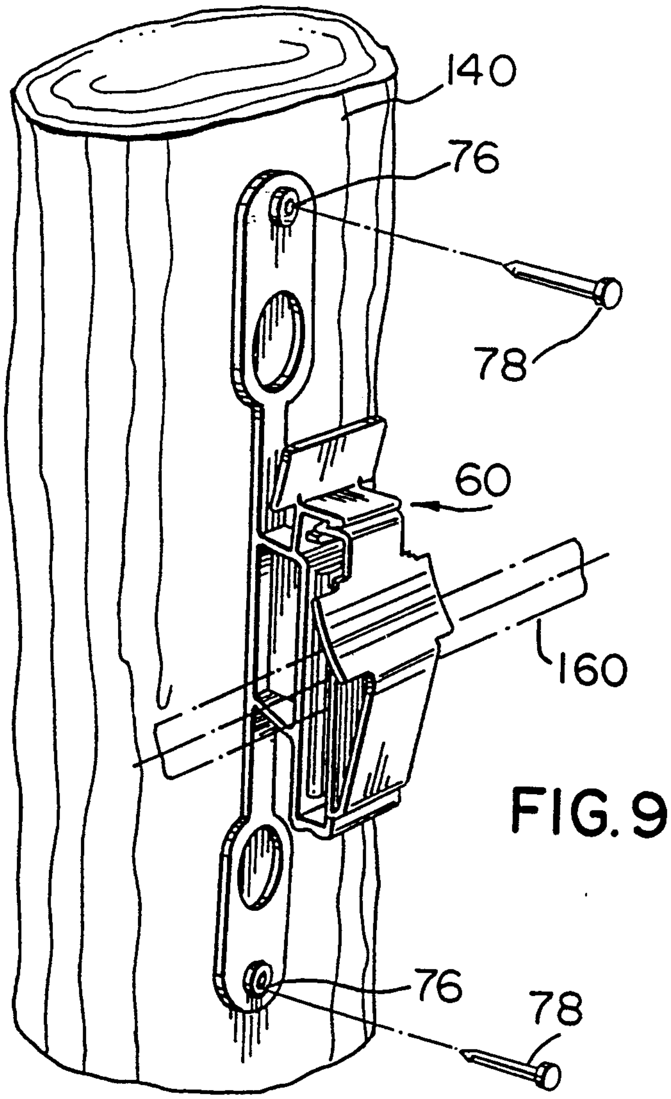
Figure 10:
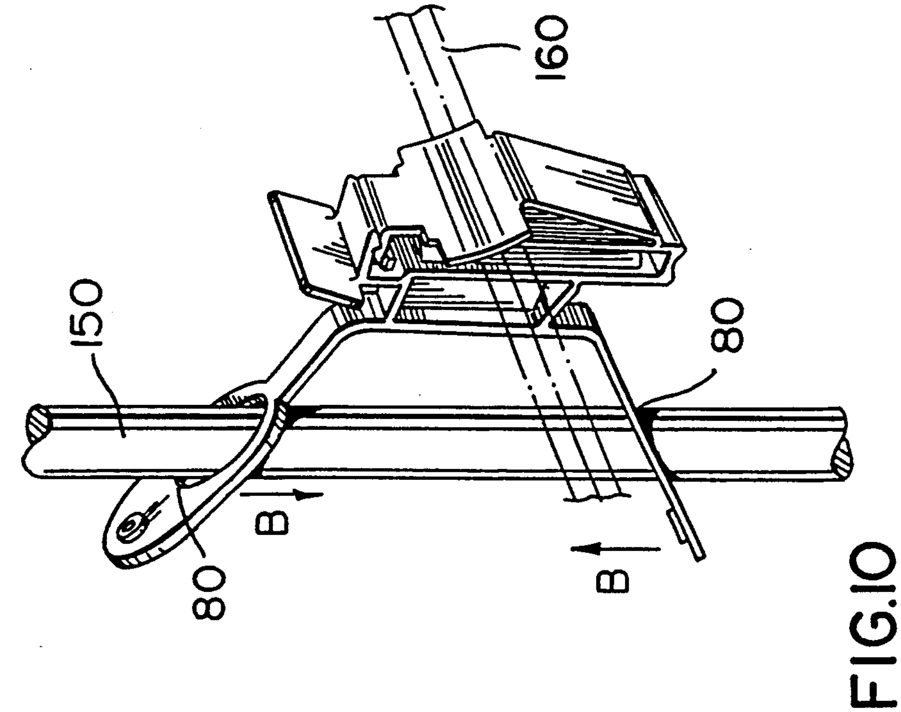
Figure 8:
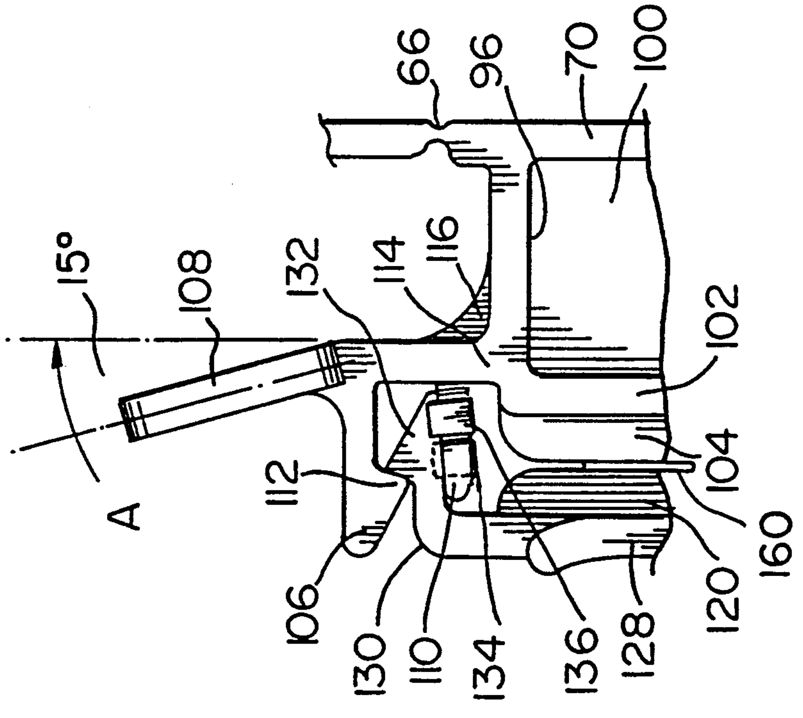

FIGS. *7a* and *7b* are sectional views along lines *7a*—*7a* and *7b*—*7b* of FIG. 4;

FIG. 8 is an enlarged side view of part of the novel insulator in the closed position;

FIG. 9 is a perspective view of the novel insulator supporting an electrified wire in association with a wooden post 1; and FIG. 10 is a perspective view of the novel insulator supporting an electrified tape in association with a vertical non-conductive rod or post.

DESCRIPTION OF THE PREFERRED EMBODIMENTS

Figure 1:
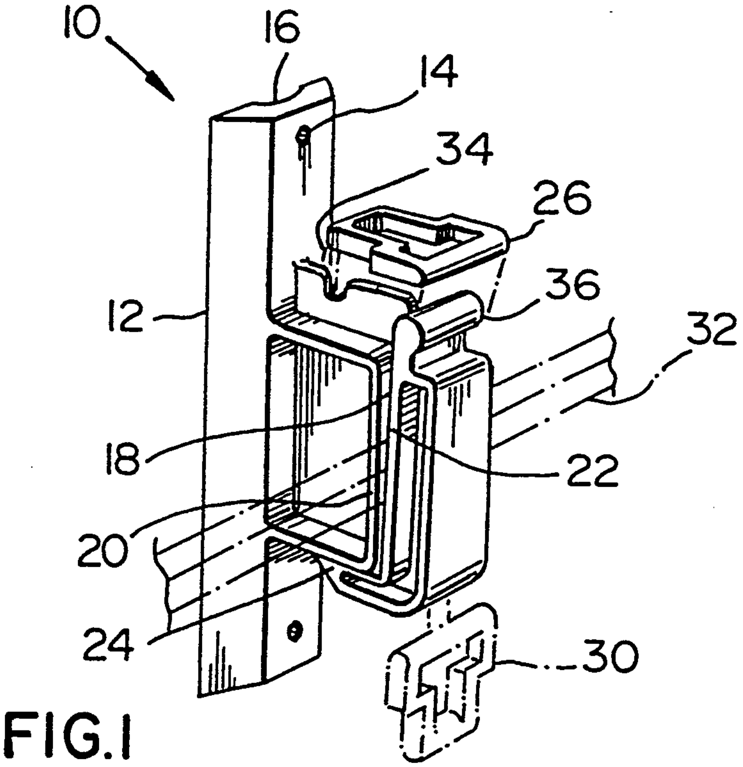
FIG.1 PRIOR ART
FIGS. 1 and 2 are perspective views of prior art insulators.
Figure 2:
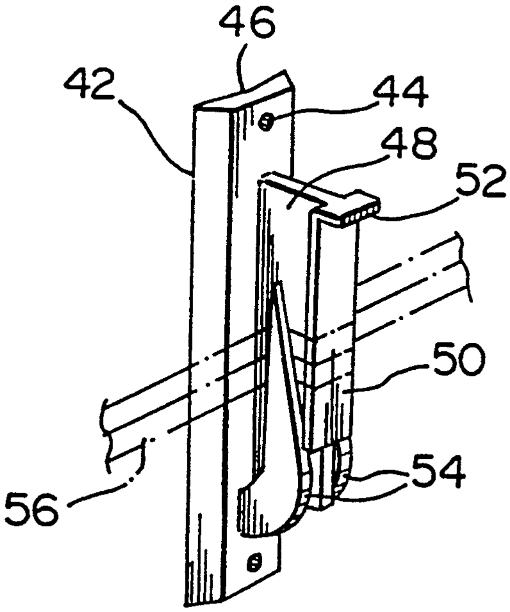
FIG. 2 PRIOR ART

Turning to the drawings, FIGS. 1 and 2 illustrate prior art insulators each integrally molded of plastic. FIG. 1 shows an insulator 10 having back 12 with nail holes 14 defined therein for permitting attachment of the insulator to a wooden post. The back 12 has a slight axially or longitudinally extending curvature at 16 so as to facilitate alignment of the insulator with a vertical support rod (not shown). A narrow slot 18 is defined between an inner flange 20 and an outer flange 22, which outer flange 22 is rigidly non-pivotably connected at its bottom portion to a web means 24 which also supports flange 20 outwardly of back 12. Closed fastener element 26 is integrally molded with insulator 10 at the position 30 shown in dotted lines. When insulator 10 is to be used, element 26 must be broken off so that the insulator can be connected to the appropriate post or rod. The tape 32 is then slid or inserted downwardly into slot 18 and then element 26 is secured in place between flange recess 34 and the top 36 of flange 22. In view of the rigidity of the flanges 20, 22 and the molding techniques thereof, slot 18 often has flashing or burrs associated therewith which can tear or damage tape 32 when inserted into slot 18. Furthermore, fastener 26 must be detached from its position as originally molded upon the insulator 10 before the insulator is used, and may be lost or misplaced while the insulator is being secured to an appropriate post or rod. Finally, fastener 26 has to be snap fitted in place after the tape is inserted.

FIG. 2 shows an insulator 40 having a back 42 with nail holes 44 defined therein and a "V" shaped recess 46 for purposes similar to those characteristics of the like features of the insulator in FIG. 1. The FIG. 2 embodiment has an outwardly extending web 48 with an edge flange 50 and an upper lip 52. Wing elements 54 extend outwardly at an angle with respect to web 48 leaving a space through which tape 56 may be passed from a positions behind the rear of the wing elements 54 to a position in front of flange 50. The wire or tape 56 is subject to manipulation and bending when connected to the insulator in order for it to follow the looped path it must take in order to be secured upon the insulator.

In the case of both the known insulators of FIGS. 1 and 2, if non-conductive rods are used, the insulators are connected by wrapping wire or like means about the upper and lower ends of the backs 12 or 42 and about the rod or post. The wire must obviously be tight in order to maintain a secure connection of the insulator upon the non-conductive rods, and this limits movement of the insulator along the post or rod if the height of the wire has to be altered. Furthermore, the connection of the insulators to the non-conductive rods is labor intensive.

Turning now to the novel insulator of this invention, and in particular to FIGS. 3–10, insulator 60 is integrally molded of non-conducting material such as, for example, polypropylene, and has two elongated arms 62, 64 for attachment of the insulator 60 to appropriate post means as detailed further herein. Arms 62 and 64 are hinged respectively at 66 and 68 to central section 70 which holds the electrified tape or wire referred to herein.

Arms 62, 64 are mirror images of each other and each includes a circular boss 72 adjacent the respective rounded end 74 with a hole 76 therethrough, which hole 76 is adapted to accept a fastener device such as, for example, a nail 78 (FIG. 9).

Figure 5:
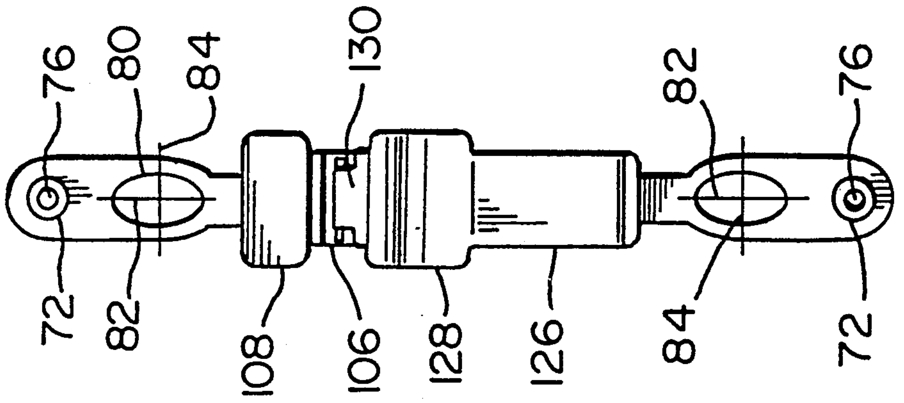
FIG. 5 is a front view of the novel insulator in the closed position.
Figure 6:
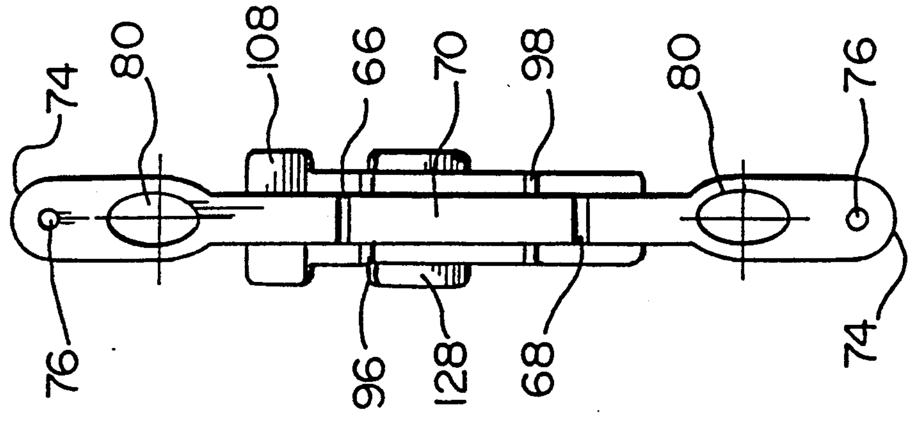
FIG. 6 is a rear view of the novel insulator.

Axially inwardly of each end 74 but outwardly of hinges 66 and 68 there is an oval or elliptical aperture 80 which has its major axis 82 aligned in the longitudinal direction of the respective arms and its minor axis 84 at right angles thereto (see FIGS. 5 and 6). Hinges 66 and 68 (hinge 66 is shown in greater detail in FIG. 8) are molded such that the stress or memory within the hinges will tend to or try to maintain the arms flat or within the same plane as central section 70. The technology for achieving this in connection with molded hinges is well known in the art.

Central section 70 has wire or tape backing portion 90 disposed forwardly of the plane of the arms 62 and 64 and securing portion 92 hinged to the backing portion 90 at hinge 94.

Backing portion 90 includes forwardly extending upper and lower flanges 96, 98, longitudinally separated by means of a web 100, and merging with front tape support flange 102 having outer support pad 104 as best seen in FIG. 8. Extending upwardly from a position adjacent to the junction of upper flange 96 and the upper part of front support flange 102 is female cantilever lock element 106 with release tab 108. Lock element 106 includes tongue 110 and lock shoulder 112 which is adapted to cooperate in defining a lock means as will be further detailed herein. Release tab 108 is angled forwardly from the vertical, as best seen in FIGS. 8 and 9, and preferably at an angle of approximately 15°, and when pushed rearwardly in the direction of Arrow A, as seen in FIG. 8, it tends to cause bending/pivoting of lock element 106 about junction point 114 just above gusset 116, thereby causing greater separation of shoulder 112 with respect to tongue 110 and enabling the release of the male locking means associated with hinged securing portion 92, as will be more fully described herein.

Securing portion 92, hinged at 94 to backing portion 90, includes supports pad 120 backed by means of support flange 126. Web 124 extends between pad 120 and support flange 126, with flange 126 merging into a push pad 128. Extending from the free end of securing portion 92 is a male lock element 130 comprising lock shoulder 132. Laterally spaced guide bars 134 and 136 are located, one upon either side of element 130, so as to define a space therebetween into which tongue 110 is adapted to move when the securing portion 92 and backing portion 90 are secured or locked together, as shown in FIG. 8.

Figure 3:
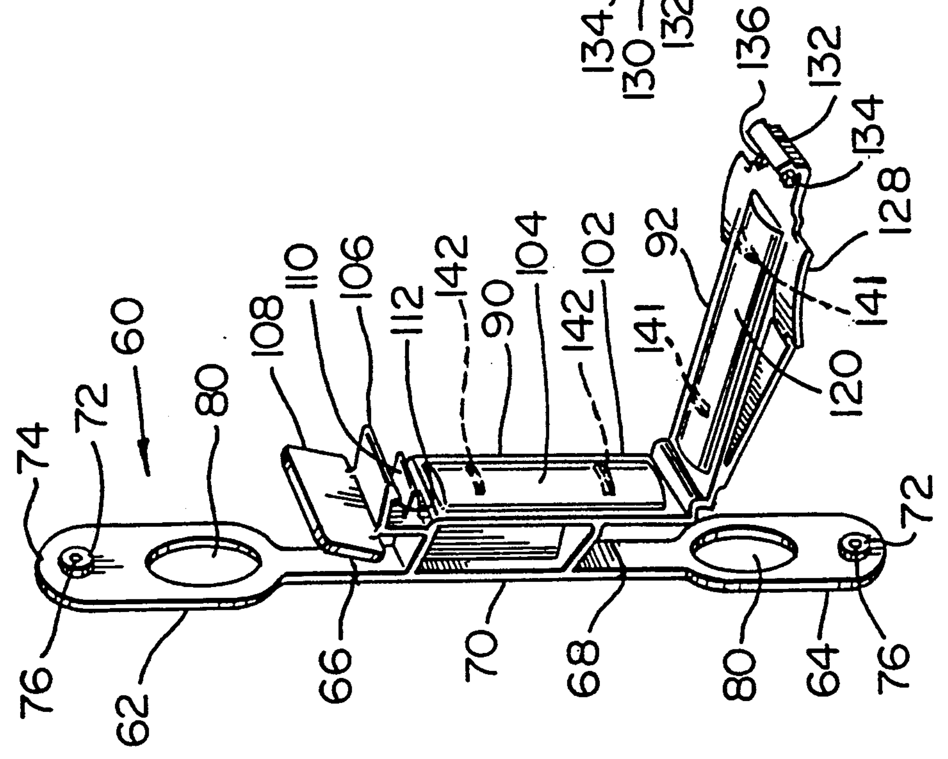
FIG. 3 is a perspective view of an insulator according to the invention, in an open position.
Figure 7A:
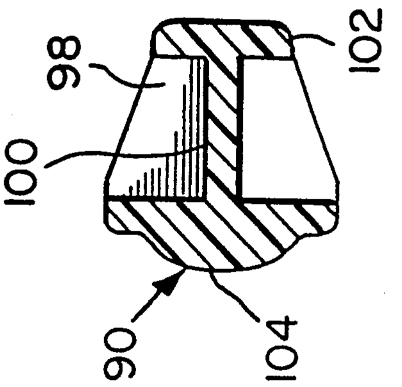
Figure 7B:
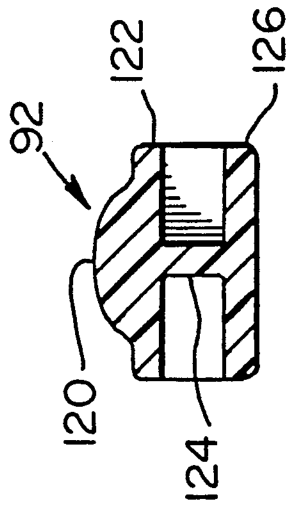

Shown as 141 and 142 in dotted lines in FIGS. 3 and 4 are slight grooves defined respectively within pads 120 and 104 which grooves may be incorporated if desired so as to provide means for more specifically locating electrified wire between the pads when used in lieu of electrified tape.

In use, insulator 60 may be fastened directly to a wooden fence post 140 as shown in FIG. 9 by means of nails 78 or like fasteners. Hinges 66, 68 allow insulator 60 to be nailed securely over imperfections within the fence post surface without damage to the insulator or loss of holding strength.

Alternatively, it may be desired or required (such as, for example, when metal fence posts are present) to use a relatively thin fiberglass rod or post 150 as shown in FIG. 10, whereby when the insulator is connected to the post 150 as shown in this figure, the memory or stress defined within hinges 66 and 68 tends to cause the arms 62 and 64 of the insulator 60 to straighten out. This causes the edges of the elliptical or oval shaped apertures 80 to contact the rod 150 thereby creating sufficient friction so as to securely hold the insulator in place upon the rod. The elliptical or oval shaped apertures 80 allow for variations in the size of the rod 150. Furthermore, insulator 60 may be adjusted upon rod 150 by moving arms 62, 64 longitudinally inwardly towards each other in the direction of Arrows B as seen in FIG. 10 and against the inherent bias, within hinges 66 and 68, thereby reducing or decreasing the frictional contact defined between the edges of apertures 80 and rod 150.

Tape 160 is held between pads 104 and 120 of backing portion 90 and securing portion 92 when securing portion 92 is pivoted upwardly toward backing portion 90 so that lock elements 106 and 130 are adjacent to each other. A force exerted upon push pad 128 forces the lock elements 106 and 130 together whereby shoulders 112 and 132 engage. Guide bars 134, 136, one upon either side of tongue 110, restrict lateral movement of the securing portion 92 relative to backing portion 90.

If it is desired to release the lock elements 106 and 130 from each other, pressure exerted upon tab 108 causes greater separation of the female lock shoulder 112 with respect to tongue 110 and allows for separation of male lock shoulder 132 from female lock shoulder 112, thus enabling the securing portion 92 to be movably pivoted outwardly and downwardly about hinge 94 with respect to backing portion 90.

Accordingly, there is provided an insulator for an electrified fence which is easily adaptable for use with wooden fence posts or non-conductive support rods permits fast, easy and secure connective support for the wire or tape upon the rod or post without the possibility of damage as well as permitting easy and quick disconnection thereof, and which provides a device which is easily and cost effectively integrally molded.

Although a preferred embodiment of the invention has been disclosed, various modifications and changes will be apparent and may be made without departing from the spirit and scope of the invention as defined in the appended claims.

The embodiments of the invention in which an exclusive property or privilege is claimed are defined as follows:

1. A plastic insulator for holding electrified wire, comprising:
   - means for supporting an electrified wire; and
   - means for selectively connecting said supporting means to a support structure;
   - said connecting means including an axially elongate structure comprising an axially central section and two arm sections extending in opposite directions with respect to each other from axially spaced end portions of said central section, first means defined within said two arm sections by which said supporting means may be connected to a suport structure with separate fastener means, and second means defined within said two arm sections by which said supporting means may be connected to a support structure without separate fastener means;
   - said supporting means comprising a backing portion, a securing portion hingedly connected to said backing portion for cooperating therewith in order to support said electrified wire therebetween when said securing portion is moved from an open position relative to said backing portion to a closed position relative to said backing portion, web means for fixedly supporting said backing portion of said supporting means upon said connecting means in spaced relation with respect to said central section of said connecting means, latch means provided upon said securing portion of said supporting means, and keeper means fixedly provided upon one of said backing portion and said web means for lockingly cooperating with said latch means of said securing portion so as to releaseably maintain said securing portion in a latched state with respect to said backing portion in order to support said electrified wire therebetween when said securing portion is moved to said closed position from said open position relative to said backing portion.

2. The insulator according to claim 1 wherein said first means defined within said two arm sections comprises means for accommodating separate drive fastener means.

3. The insulator according to claim 2 wherein said second means defined within said two arm sections comprises an oval aperture therein, the major axis of the oval aperture lying along the axis of said connecting means.

4. The insulator according to claim 3 wherein said two arm sections are flexibly connected to said central section whereby said arms may be bent rearwardly for telescopic association of said apertures with said support structure 5. The insulator according to claim 4 wherein the flexible connection of said arms include integral hinge means constructed to bias said arms to a straight line position.

6. An insulator as set forth in claim 2, wherein: said means for accommodating separate drive fastener means comprises holes for receiving said separate drive fastener means, whereby said insulator can be mounted upon a wooden fence post constituting said support structure.

7. The insulator according to claim 1 wherein said backing and securing portions include confronting support pads for direct contact with said wire.

8. An insulator as set forth in claim 7, further comprising:
   - groove means defined within said support pads for accommodating said electrified wire.

9. The insulator according to claim 1 wherein said keeper means comprises a female lock element associated with said backing portion with a release tab extending therefrom, and said securing portion includes said latch means which comprises a male lock element for cooperative association with said female lock element and which is releasable therefrom upon deflection of said release tab.

10. The insulator according to claim 9 wherein said female lock element includes tongue means and said male lock element includes lateral guide means for cooperation with said tongue means, whereby in locked association, relative lateral movement between said lock elements is restricted by cooperation between said tongue means and said guide means.

11. An insulator as set forth in claim 9, wherein:
   - said release tab is disposed at an angle of approximately 15° with respect to a vertical plane.

12. An insulator as set forth in claim 1, wherein:
   - said insulator is fabricated from polypropylene.

13. An insulator as set forth in claim 1, wherein: said keeper means is mounted upon said web means.

14. An insulator as set forth in claim 1, wherein: said second means comprises apertures, whereby said insulator can be mounted upon a non-conductive rod constituting said support structure said second means comprises oval apertures, whereby said insulator can be mounted upon a fiberglass rod constituting said support structure.

15. An insulator as set forth in claim 1, wherein: said second means comprises oval apertures, whereby said insulator can be mounted upon a fiberglass rod constituting said support structure.

* * * * *